No. 878,812. PATENTED FEB. 11, 1908.
Z. A. LIVELY.
HORSE DETACHER.
APPLICATION FILED AUG. 30, 1907.
2 SHEETS—SHEET 1.
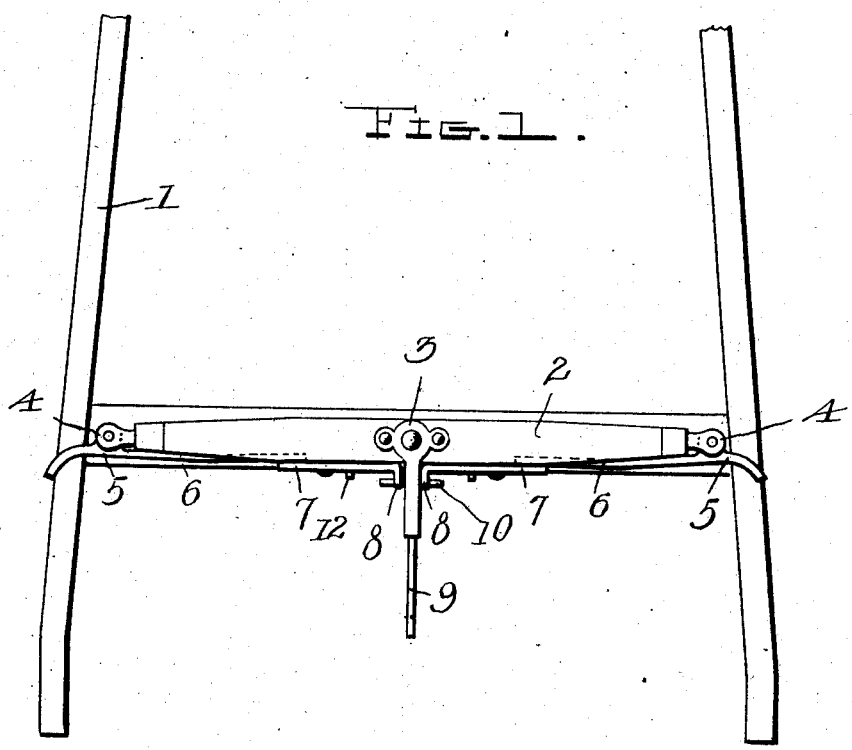
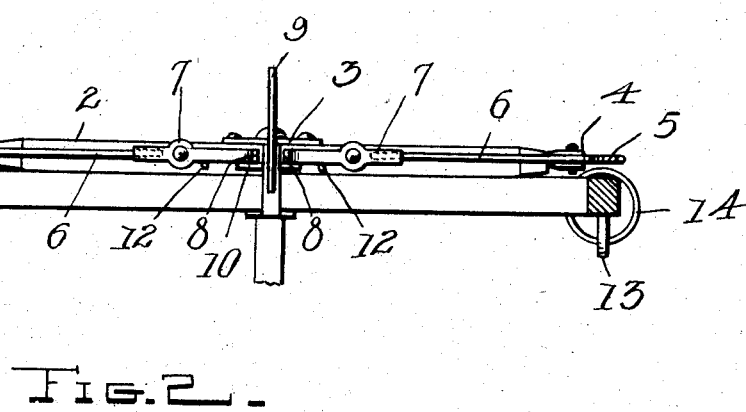
Witnesses
Inventor
Z. A. Lively
by H. B. Willson & Co
Attorneys No. 878,812. PATENTED FEB. 11, 1908.
Z. A. LIVELY.
HORSE DETACHER.
APPLICATION FILED AUG. 30, 1907.
2 SHEETS—SHEET 2.
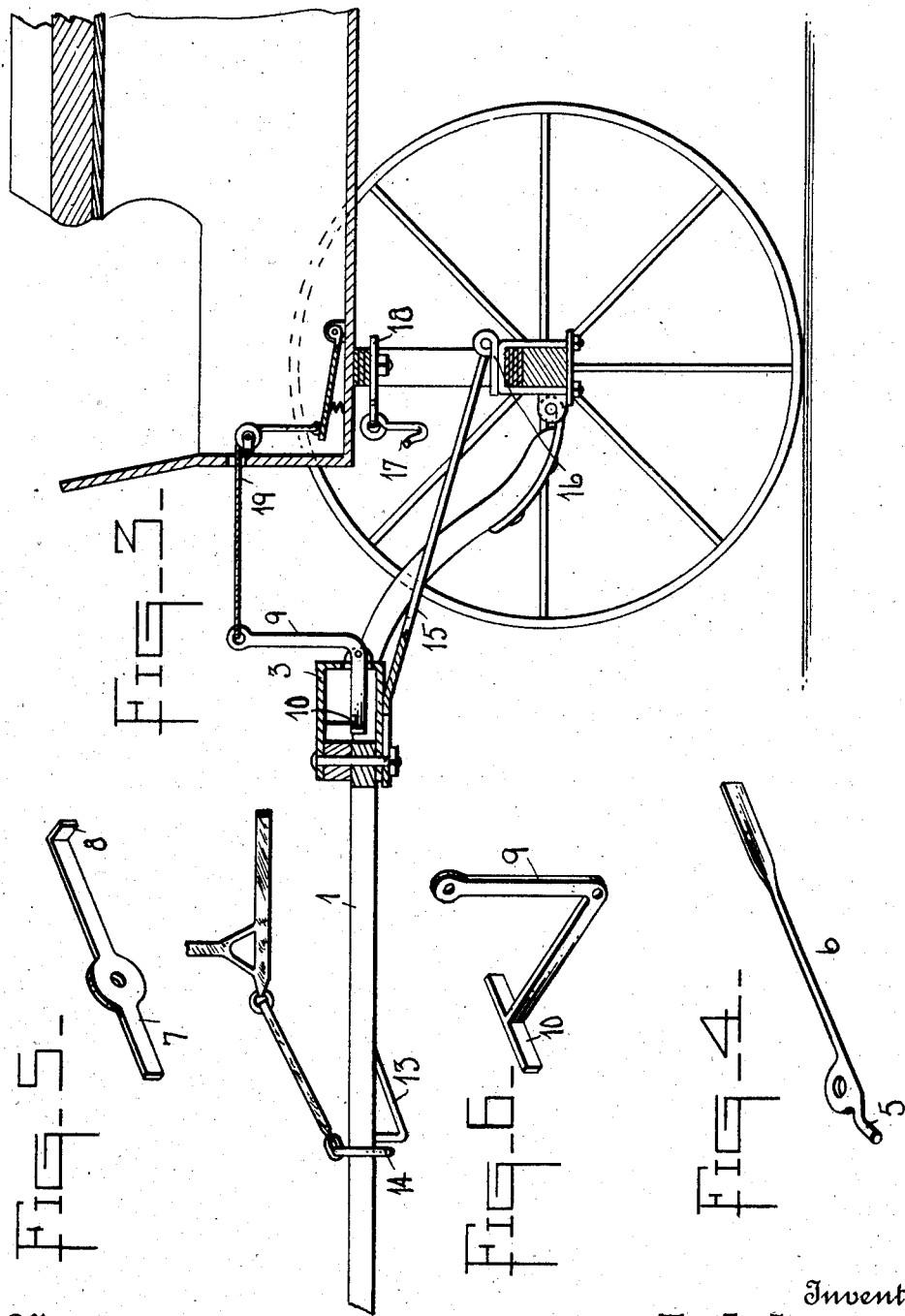
Witnesses
L. B. James
C. H. Griesbauer
Inventor
Z. A. Lively
by H. B. Willson & Co
Attorneys

UNITED STATES PATENT OFFICE.

ZELOTES A. LIVELY, OF ROSEVILLE, WEST VIRGINIA.

HORSE-DETACHER.

No. 878,812.　　　　　Specification of Letters Patent.　　　　　Patented Feb. 11, 1908.

Application filed August 30, 1907. Serial No. 390,760.

*To all whom it may concern:*

Be it known that I, ZELOTES A. LIVELY, a citizen of the United States, residing at Roseville, in the county of Fayette and State of West Virginia, have invented certain new and useful Improvements in Horse-Detachers; and I do declare the following to be a full, clear, and exact description of the invention, such as will enable others skilled in the art to which it appertains to make and use the same.

This invention relates to improvements in horse detaching devices for the swingletrees of vehicles.

The object of the invention is to provide a device of this character by means of which a horse may be readily released and permitted to leave the shafts by the occupant of the vehicle.

A further object is to provide means whereby the shaft will be supported and prevented from dropping onto the ground after the horse leaves the same.

With these objects in view, the invention consists of certain novel features of construction, combination and arrangements of parts as will be more fully described and particularly pointed out in the appended claims.

In the accompanying drawings, Figure 1 is a plan view of the inner end of a pair of shafts and a swingletree, showing the application of the invention and illustrating in full lines the operative position of the parts, and in dotted lines the released position of the same; Fig. 2 is a vertical sectional view through the shaft, looking toward the rear side of the swingletree; Fig. 3 is a longitudinal vertical sectional view through the rear end of the shaft, the swingletree and the forward end of the vehicle, showing the manner in which the shafts are supported; Fig. 4 is a detail view of one of the trace hooks or fastening bars; Fig. 5 is a similar view of one of the catches for the trace hooks; and Fig. 6 is a similar view of the releasing lever for the catches.

Referring more particularly to the drawings, 1 denotes a pair of shafts which may be of the ordinary or any desired construction. To the cross bar, near the rear ends of the shafts is pivotally connected a swingletree, 2, to which and to the pivot bolt of the same on the underside of the cross bar of the shafts, is secured a clevis 3, said clevis being connected at its upper end to the swingletree in such a manner as to turn or move therewith.

Secured in the outer ends of the swingletree are bearing eyes or loops, 4, to each of which is pivotally connected a trace hook or fastening, 5, with the outer rearwardly bent ends of which is adapted to be engaged the ends of the traces. On the hooks 5 is formed an inwardly projecting fastening bar 6, which, when the trace hooks are in an operative position, are adapted to engage and fit into the longitudinally disposed recesses formed in the rear side of the swingletree. The inner ends of the bars 6 are preferably flat and lie flush with the rear side of the swingletree, and with said flattened ends are adapted to be engaged catches, 7, which are pivotally mounted on the rear side of the swingletree and are provided on their inner ends with offsets or rearwardly projecting lugs 8. With the lugs 8 is adapted to be engaged a releasing lever, 9, which is pivotally mounted on the clevis 3, as shown. The lever 9 is provided on its inner end with a cross bar 10, which is adapted to simultaneously engage the lugs 8 of the catches, whereby when said lever is actuated, both catches will be disengaged from the inner ends of the bars 6, thus permitting the hooks 5 to turn forwardly to disengage the trace therefrom. In the rear side of the swingletree, below the catches 7, are stop pins 12, adapted to be engaged by said catches when the same are operatively engaged with the inner ends of the fastening bars 6.

On the underside of the shafts are secured stops, 13, with which are adapted to be engaged rings, 14, which are slipped onto the ends of the shafts, and to which are to be connected the forward ends of the breeching straps, and also the saddle and back band straps. By means of the stops 13 and rings 14, the shafts are supported by the harness, and the backing of the vehicle permitted. At the same time, when the traces are disengaged from the swingletree hooks, the horse may be readily passed out of the shafts, as the rings, 14, will readily slip forward off the outer ends of the same.

In order that the shafts will be prevented from dropping and the ends of the same thus violently engaged with any obstruction, I provide a suitable shaft supporting mechanism, which is here shown and preferably consists of a rearwardly projecting bar 15, the forward end of which is connected to the lower end of the pivot bolt of the swingletree, while the rear end is connected by a link, 16, to the lower bolt of the forward vehicle spring. In connection with the supporting mechanism I also provide means for holding the shafts in a substantially upright position, said means comprising a hook, 17, which is connected by a link, 18, to the upper bolt of the vehicle spring, as shown. When the shafts are swung upwardly to a raised position, the hook 17 is engaged with the supporting bar, 15, thereby holding the shafts in an elevated position.

In order that the releasing mechanism may be actuated by the occupant of the vehicle, an operating cord, 19, is provided, one end of said cord being secured to an eye formed on the inner end of the releasing lever, 9, while the opposite end extends into the vehicle within convenient reach of the occupant thereof.

The rearward pull of the operating cord will cause the inner end of the releasing lever to move upwardly into engagement with the lugs 8 on the catches 7, and thus disengage the same from the inner ends of the fastening bars, 6.

Having thus fully described my invention, what I claim as new and desire to secure by Letters-Patent, is:

1. A horse detacher comprising trace-engaging hooks adapted to be pivotally mounted on the ends of the swingletree, fastening bars formed on the inner ends of said hooks, pivotally mounted catches adapted to be engaged with the inner ends of said fastening bars, a releasing lever pivotally mounted on the clevis of the swingletree, an integrally formed cross bar on the outer end of said lever adapted to be simultaneously engaged with the inner ends of the catches, whereby the outer ends thereof are disengaged from the fastening bars of the trace hooks, a flexible operating element connected to said lever and extending to the vehicle, a shaft supporting bar pivotally connected at one end to the vehicle and having a sliding connection at its opposite ends with the shafts, whereby the latter will be supported when the horse leaves the same, substantially as described.

2. A horse detacher comprising trace-engaging hooks adapted to be pivotally mounted on the ends of the swingletree, fastening bars formed on the ends of the said hooks, pivoted catches adapted to be engaged with the inner ends of said bars, a releasing lever pivotally mounted on the clevis of the swingletree, a cross bar on the outer end of said lever adapted to be simultaneously engaged with the inner end of said catches whereby the outer ends of the same are disengaged from the fastening bars of the trace hooks, a flexible element connected to said lever and extending to the vehicle, and a foot-operated treadle connected to said flexible element whereby said lever is operated, substantially as described.

In testimony whereof I have hereunto set my hand in presence of two subscribing witnesses.

ZELOTES A. LIVELY.

Witnesses:
I. B. KINCAID,
ARTHUR BECKLAND.